April 23, 1940.  C. T. CUTTING  2,198,528
STICK HOLDER
Filed June 29, 1939
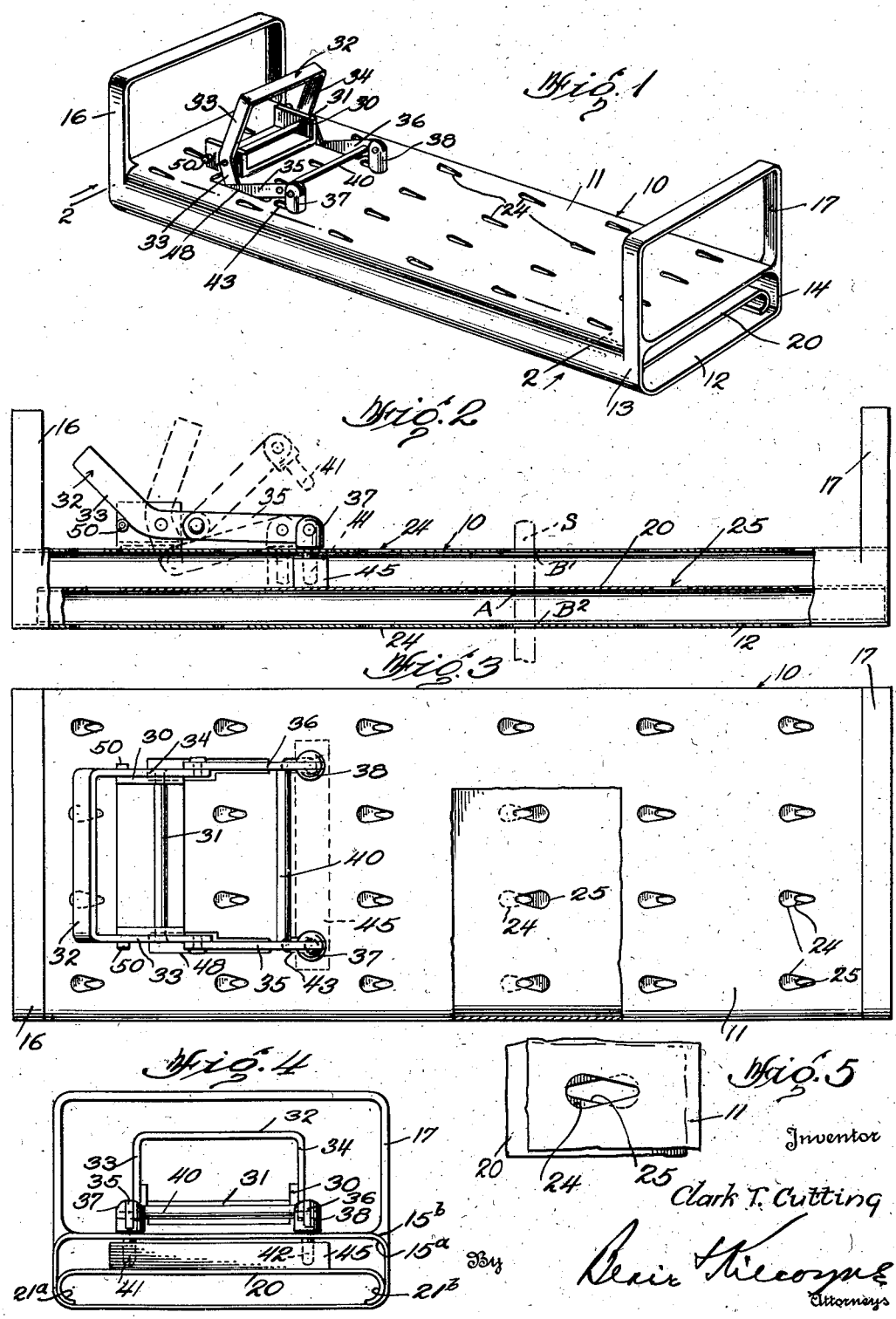
Inventor
Clark T. Cutting Patented Apr. 23, 1940

2,198,528

UNITED STATES PATENT OFFICE 2,198,528

STICK HOLDER

Clark T. Cutting, Syracuse, N. Y., assignor to The Lamson Company, Incorporated, Syracuse, N. Y., a corporation of Massachusetts Application June 29, 1939, Serial No. 281,781

14 Claims. (Cl. 294—87)

This invention relates to improvements in stick holders and, with regard to its more specific aspects, to stick holders for handling, during the course of their production, frozen confections of the type generally provided with sticks serving as handles therefor.

Among the objects of the invention may be noted the provision of a stick holder of a sanitary and readily cleanable nature; the provision of a stick holder characterized by a minimum of surface on which the materials usually employed in the making up of the confections may stick and which further can be taken apart readily and in a simple operation for the purpose of cleaning the constituent parts thereof; the provision of a stick holder of the stated character which is so constructed and arranged as to positively hold the sticks in proper position without danger of injury thereto as is likely to occur when the sticks are held by knife or sharp-edged gripping devices and without requiring that the sticks be notched or otherwise indented for their securement; the provision of a stick holder which inherently and in automatic manner operates to secure a plurality of sticks in a substantially true vertical position with reference to the holder while positively maintaining them against tilting or edgewise movement; the provision of a stick holder having stick openings which are so shaped and devoid of sharp edges that the sticks may be freely inserted into said openings and released therefrom without impairment or distortion thereof; the provision of a stick holder so constructed and arranged that it may be loaded by hand or machine, the stick openings being of ample size as to freely receive the sticks regardless of the elected method of loading; the provision of a stick holder which is capable of automatically venting itself when actuated to release position; and the provision of a stick holder which is further characterized by simple construction, durability in use, and by effective and semi-automatic operation.

Other objects will be in part obvious and in part hereinafter pointed out in connection with the following analysis of this invention wherein is illustrated an embodiment of the invention in detail.

In the drawing—

Fig. 1 is a perspective view of a stick holder in accordance with the present invention;

Fig. 2 is a section along lines 2—2 of Fig. 1;

Fig. 3 is a top plan view of the stick holder, the top plate of the body member being broken away to illustrate the relation of the locking plate apertures;

Fig. 4 is an end view of the holder illustrated in the preceding figures; and

Fig. 5 is a detail showing the relation of the stick receiving apertures when the locking plate is in release position.

Referring now to the drawing, wherein like reference characters designate like parts throughout the several views, reference character 10 designates an elongated hollow body member of generally rectangular section, the member being constituted by a top plate 11, a bottom plate 12, and connecting side walls 13, 14. By reference particularly to Figs. 1 and 4, all corners are rounded both interiorly and exteriorly of the body member, as indicated in Fig. 4 at 15a, 15b, thus to provide readily cleanable plane and interconnecting curved surfaces throughout. Handles 16, 17 extend upwardly of the top plate at the ends thereof, being secured in approved manner either to the top plate or to the side walls or to the rounded corner sections joining the same.

Preferably, the body member is open at both ends and is adapted to receive a locking plate member constituted by a locking plate section 20 of length substantially that of the body member 10. In width the locking plate is somewhat less than that of the top and bottom plates 11, 12, and the side edges thereof are flanged downwardly along a curvature and are thence curled inwardly, as more clearly indicated at 21a, 21b, Fig. 4. The curled flanges are adapted to bear against the lower rounded corners of the body member and to some extent against the side wall and bottom plate portions adjacent said corners, thus to position and locate the locking plate transversely with reference to the body member. The depth of the flanges 21a, 21b, is such as to position the locking plate section 20 intermediate the level of the top and bottom plates 11, 12, and preferably midway therebetween.

By reference to Figs. 1 and 2, the top and bottom plates 11, 12 are each provided with a plurality of stick receiving apertures 24 arranged preferably in longitudinal and transverse rows. In the device shown the apertures of the top and bottom plates have an arrangement of four longitudinal and six transverse rows, this row arrangement, however, being for purpose of illustration only. The top and bottom plates have the same number of stick receiving apertures, and the arrangement is such that the apertures of one plate, such as plate 11, are in vertical alignment with those of the other plate, such as the plate 12.

Preferably, the apertures 24 are of tear-drop shape and are symmetrically arranged with reference to the axis of the longitudinal rows; that is to say, the narrow or pointed ends of the apertures all point to the same end of the body member 10, which in the device illustrated is the right end, with the larger or rounded ends of the apertures extending in the direction of the other or left end of the body member. It is also to be understood that the narrow or pointed ends of the apertures are not brought to a sharp point or apex but, rather, they terminate along the curvature of a minute radius.

The locking plate 20 is also provided with a plurality of apertures 25, preferably of tear-drop shape, the apertures 25 being arranged in generally vertical alignment with the apertures 24 of the plates 11 and 12, but disposed oppositely with reference thereto. Thus the relatively pointed ends of apertures 25 extend in the direction of the left end of the body member 10.

In the normal release position of the locking plate 20, the apertures 25 thereof are related to the apertures 24 of the top plate 11 and also to the apertures of the bottom plate 12 in the manner indicated in Fig. 5; that is to say, the apertures of the plates are positioned in vertical alignment and registration as to provide an elongated diamond- or keystone-shaped through opening for the reception of the sticks to be held.

With the plates so related that the overlying and aligned apertures thereof form a plurality of stick receiving openings, as indicated in Fig. 5, the holder may be loaded by hand or by a machine operation, thus to position a stick in each of the sets of vertically aligned plate openings. Regardless of the manner of loading, the apertures are of such length that the sticks, which generally take the form of wood strips of substantial width in relation to thickness, are freely insertible through the sets of aligned plate openings to the desired depth.

In order to secure the sticks of the loaded holder, the locking plate 20 is actuated to locking position, such actuation in the device under illustration comprising movement of the locking plate longitudinally of the body member so that the apertures thereof move out of substantial vertical registry with reference to apertures 24, and in such direction that the pointed ends of the apertures 25 of the locking plate move towards the pointed ends of the apertures 24 of the top and bottom plates. By such movement of the locking plate and hence of the apertures thereof, the effective length of the diamond-shaped through openings is shortened, and the sticks received in said openings are each engaged at all four corners by the inclined aperture edges which define the pointed ends thereof. In initially engaging the sticks, the inclined aperture edges operate to locate the sticks in a predetermined fixed position with reference to the holder; that is to say, each stick is "centralized" with reference to its opening as formed by a set of aligned apertures. Thereupon the located sticks are gripped by the aperture edges as the locking plate moves to its full locking position. The amount of locking plate movement is of course determined by the width of the sticks, being such that in full locking position the aperture edges firmly grip all four corners of the sticks with a wedging action.

By reference to Fig. 2 wherein a stick S is shown to be located in the holder, it will be understood that the two corners along one side edge of the stick have been engaged at the point A by the inclined edges defining the pointed ends of the locking plate apertures, and that the two corners of the stick along its other side edge have been engaged at the two points $B^1$ and $B^2$ by the inclined edges defining the pointed ends of the apertures of the top and bottom plates 11, 12. With such a three-point engagement and with the points $B^1$ and $B^2$ being disposed in true vertical alignment by reason of the like alignment of the top and bottom plate apertures, it will be appreciated that movement of the locking plate to its locking position inherently and in automatic manner operates to locate and secure the sticks S in true vertical position with reference to the holder. Further, by reason of the wedging action exerted by the inclined edges of the apertures, the secured sticks are positively held against twisting, tilting or edgewise movement.

Upon return movement of the locking plate to its normal, release position, the plate 20 moves away from the sticks which thereupon fall away from the points $B_1$, $B_2$, of their engagement with the top and bottom plates, and accordingly drop from the body member. Thus, in simple manner, the device acts to vent itself upon movement of locking plate 20 to its normal, release position.

The present invention also contemplates means for actuating the locking plate to and from locking position. Such means may include a U-shaped bracket member 30 secured against the upper face of the top plate 11 and adjacent one end thereof, the legs of the bracket extending upwardly. A pintle 31 extends between the legs of the bracket and provides a mounting for a U-shaped handle 32, the legs 33, 34 of which are angled to provide bellcranks. The free end of each of the handle legs 33, 34 are flexibly connected to one end of links 35, 36, the other ends thereof being flexibly secured to clevis elements 37, 38. Links 35, 36 are held in spaced relation by a cross rod 40 whereby the free ends of said links are movable in unison.

The clevis elements 37, 38 carry downwardly extending posts 41, 42 which extend through suitably elongated apertures 43 in top plate 11 for engagement in spaced, upwardly opening sockets provided in a block 45 secured to the upper face of locking plate 20 and extending transversely thereof. It will be here noted that posts 41, 42 loosely seat in the sockets of block 45, whereby said posts may be raised therefrom when and if desired.

Top plate 11 of the body member is further provided with clearance openings 48 to permit the free end of the handle legs and links connected thereto to swing to a position below the top plate 11.

The mode of operation of the locking plate actuating means will be apparent from Fig. 2 wherein handle 32 in its full-line position has been moved to its locking position against a stop pin 50 carried by a leg of bracket 30. In such locking position of the handle the free ends of the bellcranked legs thereof have actuated links 35, 36 relatively to the right, such movement having effected movement of locking plate 20 to the right, through the medium of posts 41, 42 and block 45. When it is desired to return the locking plate 20 to its normal, release position, handle 32 is swung in clockwise direction to the dotted line position indicated in Fig. 2, thus to shorten the effective length of links 35, 36 and to actuate posts 41, 42 and hence locking plate 20 to the left. In such leftwise position of the locking plate, apertures 35 thereof generally align with aperturees 24 of the plates 11, 12, and hence sticks held in the device may discharge therefrom.

When, for cleaning purposes, it is desired to disconnect locking plate 20 and remove it from the body member, such can be effected readily by raising posts 41, 42 out of the socket openings of plate block 45 as by grasping connecting rod 40 and swinging links 35, 36 in counter-clockwise direction about the axis of connection of said links with the handle 32. With the posts in the raised position indicated by dotted lines, Fig. 2, the locking plate 20 may be slid lengthwise of the body member and entirely removed therefrom. Reinsertion of the locking plate and connection with the actuating handle mechanism may be effected in equally simple manner as by sliding the plate into the hollow body member until sockets of block 45 line up with the posts 41, 42 whereupon the posts are dropped into said sockets.

The sanitary properties of a stick holder as above described are self-evident. All of the plane surfaces and connecting rounded corners of the body member and plate are readily cleanable. Further, as above described, the holder may be taken apart readily for cleaning and thereupon re-assembled by simple operations which require no actual dismantling of the unit.

The device as above described is further so constructed and arranged that upon movement of the locking handle 32 to locking position, the device operates inherently and in automatic manner to locate and thereupon secure the sticks in a substantially true vertical relation with reference to the holder proper, as well as to maintain the sticks against tilting movement in the planes of the sticks, and also against sidewise or turning movement about the stick axes. This is so because of the vertical alignment of the top and bottom plate apertures 24 against the edges of which the sticks bear at spaced points along the length thereof; and also by reason of the fact that the oppositely pointed ends of apertures 24, 25 have a pronounced automatic wedging or scissors-like action in gripping all four corners of the sticks at spaced points along both edges, thus to prevent turning or twisting thereof. It will also be appreciated that the stick apertures are so shaped that securement of the sticks is effected without danger of impairment or injury to the sticks and, further, without requiring that the sticks be notched or otherwise indented for their securement. Obviously, as openings 24, 25 of the plates are sufficiently long as to accommodate freely the sticks to be held, the sticks are readily insertible into the unit and are freely releasable therefrom, without distortion of the sticks, upon movement of the locking plate to release position. Further, as above set forth the device is capable of venting itself in substantially automatic manner upon the locking plate being actuated to its release position.

As many changes could be made in carrying out the above constructions, without departing from the scope of the invention, it is intended that all matter contained in the above description or shown in the accompanying drawing shall be interpreted as illustrative and not in a limiting sense.

I claim:

1. A stick holder comprising spaced holder members, a locking member positioned intermediate the holder members and movable from a release position to a locking position, means for moving said locking member from its release to its locking position, the holder and locking members each having provisions forming, when the locking member is in its release position, a plurality of substantially vertical stick receiving openings which are relatively elongated and have their opposite ends pointed, and being operative upon movement of the locking member to its locking position to locate sticks received in said openings in a fixed position with reference to the holder and thereupon to grip said sticks on all four corners thereof with a wedging action whereby to secure said sticks in substantially true vertical position with reference to the holder and against tilting or edgewise movement.

2. A stick holder comprising spaced holder members, a locking member positioned intermediate the holder members and movable from a release position to a locking position, means for moving said locking member from its release to its locking position, the holder and locking members each having provisions forming, when the locking member is in its release position, a plurality of substantially vertical stick receiving openings which are relatively elongated and have their opposite ends pointed, and being operative upon movement of the locking member to its locking position to locate sticks received in said openings in a fixed position with reference to said holder and thereupon to grip said sticks on all four corners thereof with a wedging action whereby to secure said sticks in substantially true vertical position with reference to the holder and against tilting or edgewise movement, the holder provisions gripping the two corners at one edge of the sticks and at spaced points along said edge, and the locking member provisions gripping the two corners at the other edge of said sticks and at a point along said edge intermediate said two spaced points.

3. A stick holder comprising spaced holder members, a locking member positioned intermediate the holder members and movable from a release position to a locking position, means for moving the locking member from its release to its locking position, the members being each provided with a plurality of apertures, of which the apertures of the holder members are in true, vertical alignment, and the apertures of the locking member, when the latter is in its release position, are in registering alignment with aligned holder-member apertures, whereby to provide a plurality of stick receiving openings, the side edges of said openings being so shaped and arranged as, upon movement of the locking member to locking position, to locate sticks received therein in a fixed position with reference to the holder and thereupon to grip said sticks on all four corners thereof with a wedging action, thereby to secure said sticks in substantially true vertical position with reference to the holder and against tilting or edgewise movement.

4. A stick holder comprising spaced holder members, a locking member positioned intermediate the holder members and movable from a release position to a locking position, means for moving the locking member from its release to its locking position, the members being each provided with a plurality of apertures, of which the apertures of the holder members are in true, vertical alignment, and the apertures of the locking member, when the latter is in its release position are in registering alignment with aligned holder-member apertures, whereby to provide a plurality of stick receiving openings, the side edges of said openings being so shaped and arranged as, upon movement of the locking member to locking position, to locate sticks received therein in a fixed position with reference to the holder and thereupon to grip said sticks on all four corners and at points spaced alternately along both edges thereof with a wedging action, thereby to secure said sticks in substantially true vertical position with reference to the holder and against tilting or edgewise movement.

5. A stick holder comprising spaced holder plates, a locking plate positioned intermediate said plates and movable from a release position to a locking position, means for moving the locking plate from its release to its locking position, the holder and locking plates being each provided with a plurality of elongated apertures having one end pointed, the apertures of the holder plates being similarly pointed and disposed in true vertical alignment, and the apertures of the locking plate being oppositely pointed and disposed when the locking plate is in its release position in registering alignment with the aligned apertures of the holder plates, thereby to provide a plurality of stick receiving openings, the arrangement of apertures being such that upon movement of the locking plate to locking position the sticks received in said openings are gripped with a wedging action on all four corners thereof and at spaced points along their opposite edges by the inclined aperture edges which define the pointed ends of said openings whereby said sticks are secured in substantially true vertical position with reference to the holder and against tilting and edgewise movement.

6. A stick holder comprising spaced holder plates, a locking plate positioned intermediate said plates and movable from a release position to a locking position, means for moving the locking plate from its release to its locking position, the holder and locking plates being each provided with a plurality of elongated apertures having one end pointed, the apertures of the holder plates being similarly pointed and disposed in true vertical alignment, and the apertures of the locking plate being oppositely pointed and disposed when the locking plate is in its release position in registering alignment with the aligned apertures of the holder plates, thereby to provide a plurality of stick receiving openings, the arrangement of apertures being such that upon movement of the locking plate to locking position the inclined aperture edges defining the pointed ends of said openings engage and grip sticks received therein on all four corners and at spaced points along both edges thereof whereby the sticks are secured in true vertical position with reference to the holder and against tilting and edgewise movement.

7. A stick holder comprising spaced holder plates, a locking plate positioned intermediate said holder plates and movable from a release position to a locking position, means for moving the locking plate from its release to its locking position, the holder and locking plates being each provided with a plurality of tear-drop shaped apertures, the apertures of the holder plates being similarly pointed and disposed in true vertical alignment, and the apertures of the locking plate being oppositely pointed and disposed when the locking plate is in release position in registering alignment with the aligned apertures of the holder plates thereby to form a plurality of stick receiving openings having pointed ends, the arrangement being such that upon movement of the locking member to locking position the edges defining the pointed ends of the apertures forming said openings engage against and grip sticks received therein on all four corners with a wedging action, thereby to secure said sticks in true vertical position with reference to the holder and against tilting and edgewise movement.

8. A stick holder comprising spaced holder members, a locking member removably related to said holder members and positioned intermediate the same, said locking member being actuable from a release to a locking position, the members each having provisions which form, when the locking member is in its release position, a plurality of stick receiving openings and which are operative upon movement of the locking member to its locking position to secure sticks received in said openings to the holder, and means for actuating said locking member including an operating lever and a freely separable driving connection between said lever and said locking member whereby upon separation of said driving connection the locking member may be removed from the holder for cleaning of the latter without dismantling either the holder or the locking member assemblies.

9. A stick holder comprising spaced holder members, a locking member removably related to said holder members and positioned intermediate the same, said locking member being actuable from a release to a locking position, the members each having provisions which form, when the locking member is in its release position, a plurality of stick receiving openings and which are operative upon movement of the locking member to its locking position to secure sticks received in said openings to the holder, means for actuating said locking member comprising an operating lever, a driving element actuable thereby, a driven element carried by said locking member, and said driving and driven elements being arranged so as to be freely connectable and disconnectable whereby upon disconnection of said elements the locking member may be removed from the holder for cleaning thereof without further dismantling of the parts.

10. A stick holder comprising spaced holder members, a locking member removably related to said holder members and positioned intermediate the same, said locking member being actuable from a release to a locking position, the members each having provisions which form, when the locking member is in its release position, a plurality of stick receiving openings and which are operative upon movement of the locking member to its locking position to secure sticks received in said openings in the holder, and means for actuating said locking member comprising an operating lever carried by one of said holder members, and a driving connection between said lever and said locking member including freely separable post and socket members, whereby upon separation of the post and socket members the locking member may be removed from the holder for cleaning thereof without further dismantling of the parts.

11. A stick holder comprising spaced holder members, a locking member removably related to said holder members and positioned intermediate the same, said locking member being actuable from a release to a locking position, the members each having provisions which form, when the locking member is in its release position, a plurality of stick receiving openings and which are operative upon movement of the locking member to its locking position to secure sticks received in said openings to the holder, and means for actuating said locking member comprising an operating lever carried by one of said holder members, a driving post operatively connected with said lever, a socket for said post carried by said locking member and adapted to receive said driving post, from which socket member the post is freely removable, whereby upon removal of the driving post from the socket member the locking plate may be withdrawn from the holder for cleaning thereof without further dismantling of the parts.

12. A stick holder comprising an elongated hollow body member of substantially rectangular section, the body member being constituted by top and bottom plates and connecting side walls, a locking plate disposed within the body member and intermediate said top and bottom plates and adapted for movement therein from a normal release position to a locking position, said top, bottom and locking plates being each provided with a plurality of apertures, said apertures of the plates being in substantial alignment when the locking plate is in normal, release position, the locking plate having an upwardly opening post receiving socket, and means carried by the body member for actuating the locking plate from release to locking position including a longitudinally movable post extending through the top plate and into the post receiving socket of the locking plate, the arrangement being such that said post may be manually raised out of the locking plate socket, thus to disconnect the locking plate from the body member and the plate actuating means.

13. A stick holder comprising an elongated hollow body member of substantially rectangular section, the body member being constituted by top and bottom plates and connecting side walls, and the corners therebetween being rounded, a locking plate disposed within the body member and intermediate the top and bottom plates thereof, the side edges of the plate member being flanged downwardly along a curvature and being curled inwardly, thus to provide a curved bearing surface between the locking plate and the body member, the top, bottom and locking plates being each provided with a plurality of stick receiving apertures which are disposed in generally vertical alignment when the locking plate is in normal, release position, and means carried by the body member for actuating the locking plate from release to locking position in which the edges of the locking plate apertures engage against and force the sticks extending through aligned openings into gripping engagement with the edges of the top and bottom plate apertures.

14. A stick holder comprising an elongated hollow body member of substantially rectangular section, the member being constituted by top and bottom plates and connecting side walls, the body member being devoid of right-angled corners and being open-ended to receive a locking plate, the side edges of said locking plate being rounded and curled inwardly thus to be devoid of right-angled corners, the curled edges of said locking plate providing arcuate bearing surfaces on which said locking plate may be moved into and out of said body member and on which said plate member when within the body member may be moved from a normal release position to a locking position, the top, bottom and locking plates being each provided with cooperating means to receive and secure sticks to the body member upon movement of the locking plate to locking position, means carried by the body member for actuating the locking plate to locking position, and means providing for the disconnection of said actuating means from the locking plate, whereby the locking plate may be bodily withdrawn from the body member.

CLARK T. CUTTING.